(12) United States Patent
Kanamaru et al.

(10) Patent No.: US 9,728,215 B2
(45) Date of Patent: Aug. 8, 2017

(54) MAGNETIC DISK APPARATUS AND DATA RECORDING METHOD

(71) Applicant: Kabushiki Kaisha Toshiba, Minato-ku, Tokyo (JP)

(72) Inventors: Masahiro Kanamaru, Kanagawa (JP); Kazuto Kashiwagi, Kanagawa (JP); Takeyori Hara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/088,952

(22) Filed: Apr. 1, 2016

(65) Prior Publication Data
US 2016/0217815 A1 Jul. 28, 2016

Related U.S. Application Data

(62) Division of application No. 14/477,307, filed on Sep. 4, 2014, now abandoned.

(30) Foreign Application Priority Data

Apr. 15, 2014 (JP) .................... 2014-083716

(51) Int. Cl.
*G11B 19/04* (2006.01)
*G11B 5/596* (2006.01)
(Continued)

(52) U.S. Cl.
CPC .......... *G11B 5/59627* (2013.01); *G11B 5/012* (2013.01); *G11B 5/596* (2013.01); *G11B 5/59688* (2013.01); *G11B 20/10009* (2013.01); *G11B 20/10305* (2013.01); *G11B 20/10388* (2013.01); *G11B 20/1217* (2013.01);
(Continued)

(58) Field of Classification Search
CPC . G11B 5/59627; G11B 5/59688; G11B 5/012; G11B 5/596; G11B 19/041; G11B 20/1009; G11B 20/10805; G11B 20/10388; G11B 20/1217; G11B 20/1889; G11B 20/10305; G11B 27/36;
(Continued)

(56) References Cited

U.S. PATENT DOCUMENTS 7,394,607 B2 7/2008 Ohno et al.
8,587,889 B2 11/2013 Kawabe
(Continued)

FOREIGN PATENT DOCUMENTS

JP 2002-343042 A 11/2002

*Primary Examiner* — Andrew L Sniezek
(74) *Attorney, Agent, or Firm* — White & Case LLP

(57) ABSTRACT

A magnetic disk apparatus of one of the embodiments stores read position dependency information on read signal quality of a data region at a first track and measures the read signal quality at a predetermined radial position in a second data region of a second track different from the first track. A positioning error of the second data region is determined based on the read position dependency information and the read signal quality at the predetermined radial position. Data is recorded in a recording target data region in a shingled recording so as to prevent data written in the second data region from being overwritten by data in a recording target data region adjacent to the second data region by using the determined positioning error.

8 Claims, 6 Drawing Sheets

(51) Int. Cl.
*G11B 27/36* (2006.01)
*G11B 20/10* (2006.01)
*G11B 20/18* (2006.01)
*G11B 5/012* (2006.01)
*G11B 20/12* (2006.01)

(52) U.S. Cl.
CPC .......... *G11B 20/1889* (2013.01); *G11B 27/36* (2013.01); *G11B 19/041* (2013.01); *G11B 2020/10898* (2013.01); *G11B 2020/1238* (2013.01); *G11B 2020/1292* (2013.01); *G11B 2020/1869* (2013.01)

(58) Field of Classification Search
CPC .. G11B 2020/10898; G11B 2020/1292; G11B 2020/1869; G11B 2020/1238
See application file for complete search history.

(56) References Cited

U.S. PATENT DOCUMENTS

| | | |
|---|---|---|
| 8,896,959 B1 | 11/2014 | Kashiwagi et al. |
| 8,913,341 B1 | 12/2014 | Jury et al. |
| 2013/0201579 A1 | 8/2013 | Springberg et al. |
| 2014/0118857 A1* | 5/2014 | Kashiwagi ............. G11B 5/596 360/75 |

* cited by examiner

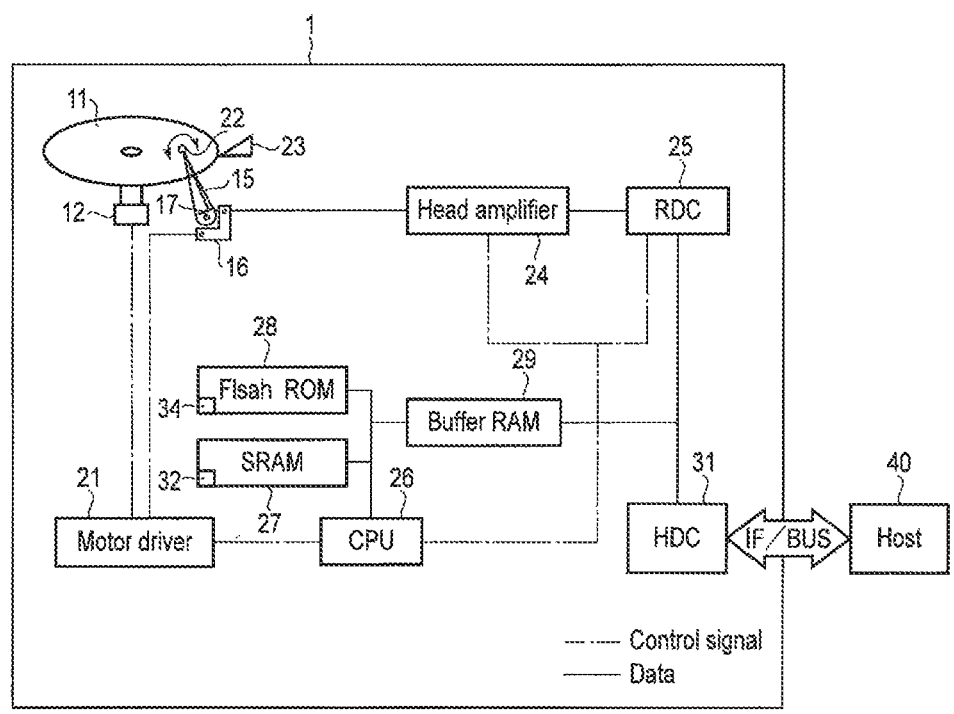
F I G. 1

MAGNETIC DISK APPARATUS AND DATA RECORDING METHOD

CROSS-REFERENCE TO RELATED APPLICATIONS

This application is a divisional of application Ser. No. 14/477,307, filed Sep. 4, 2014 which is based upon and claims the benefit of priority from Japanese Patent Application No. 2014-083716, filed Apr. 15, 2014, the entire contents of which are incorporated herein by reference.

FIELD

Embodiments described herein relate generally to a magnetic disk apparatus and a data recording method.

BACKGROUND

Recently, technology for writing tracks of a magnetic disk at high density has been developed. One of types of the technology is, for example, shingled write recording that partially overlaps the tracks. Since the data can be written on the tracks at high density by the shingled write recording, a recording capacity can be increased.

When the shingled write recording is applied, for example, if a positioning error of a first track occurs in a second track direction and a positioning error of the second track occurs in the first track direction, in an adjacent recording region of the first track and the second track written over a part of the first track, a width of the first track is narrowed. If a narrowing amount increase, the data written on the first track may be overwritten or deleted by the data of the second track at the narrowed portion.

Incidentally, technology of preventing the overwriting by setting a width of a subsequent track to be recorded to be an appropriate certain width based on the positioning error of the written track has been developed. However, a large amount of memory is required to store positioning errors of plural written tracks recorded at various radial positions on the magnetic disk.

For this reason, processing of defining a limit value for the positioning error and interrupting writing data if the positioning error exceeds the limit value may be executed to prevent the recorded data from being damaged. In this case, if the limit value is smaller than needed appropriate value, probabilities for the positioning error to reach the limit value are increased, the number of times of interrupting the writing is increased and, consequently, the recording performance may be lowered.

BRIEF DESCRIPTION OF THE DRAWINGS

FIG. 1 is a block diagram showing a structure of a magnetic disk apparatus according to an embodiment.

DETAILED DESCRIPTION

Figures 2, 3:
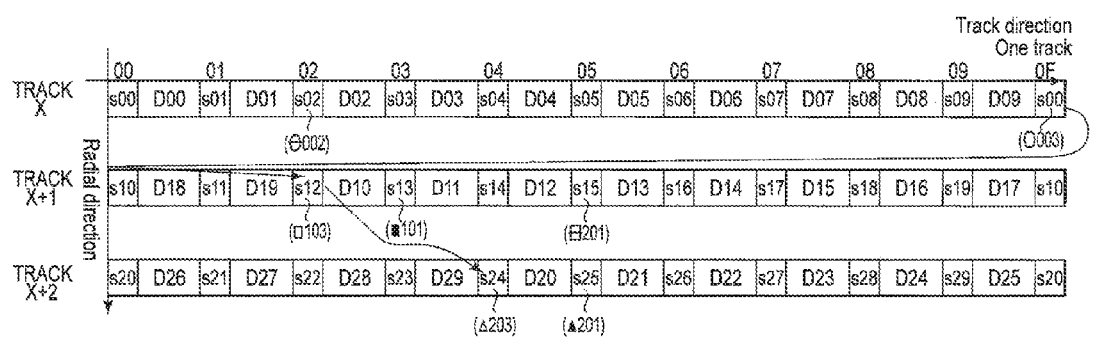
FIG. 2 is an illustration showing a positional relationship between a data sector and a servo sector included in each of plural tracks defined on a magnetic disk according to the embodiment.
FIG. 3 is a diagram showing an example of a positioning error table according to the embodiment.

In general, according to one embodiment, a magnetic disk apparatus includes: a magnetic disk in which a plurality of tracks are defined, each of the tracks alternately comprising a plurality of data regions and servo regions including burst information for detecting a positioning error; a magnetic head writing and reading data for the magnetic disk; and a processor, wherein the processor is configured: to measure read signal quality at a plurality of positions shifted from an average radial position of a recorded first data region of a first track to a radial direction of the magnetic disk, to store read position dependency information obtained by shifting the measurement result by a first predetermined distance in the radial direction; to measure read signal quality at a predetermined radial position remote by a second predetermined distance in the radial direction, from an average radial position of a recorded second data region of a second track different from the first track; to determine a positioning error of the second data region, based on the stored read position dependency information and read signal quality at the predetermined radial position of the second data region; and to record data in a recording target data region by using the magnetic head in a shingled recording, to prevent data written in the second data region by using the determined positioning error from being overwritten by data in a recording target data region adjacent to the second data region.

Various embodiments will be described hereinafter with reference to the accompanying drawings.

First Embodiment

FIG. 1 is a block diagram showing a structure of a magnetic disk apparatus according to one of the embodiments. The magnetic disk apparatus 1 of the present embodiment comprises as its schematic structure a magnetic disk 11 comprising a plurality of overlapping tracks, a spindle motor (SPM) 12 rotating the magnetic disk 11, a magnetic head 22, an actuator arm 15, a voice coil motor (VCM) 16, a lamp 23, etc. inside a housing (not shown).

A plurality of tracks are concentrically defined on the magnetic disk 11, and each track has a plurality of servo sectors (servo regions) having positional information including burst information for detecting a radial positioning error, and a plurality of data sectors including data regions. The magnetic disk 11 is rotated by the SPM 12. The actuator arm 15 is attached to a pivot 17 so as to be freely rotatable. The magnetic head 22 is attached to one of ends of the actuator arm 15. The VCM 16 is connected to other end of the actuator arm 15. The VCM 16 rotates the actuator arm 15 around the pivot 17, and positions the magnetic head 22 in a state of floating at an arbitrary radial position of the magnetic disk 11.

The magnetic disk apparatus 1 of the present embodiment comprises as its electric hardware configuration a motor driver 21, a head amplifier 24, a read/write channel (RDC))

25, a hard disk controller (HDC) 31, a central processing unit (CPU) 26, a random access memory (SRAM) 27 serving as an operation memory, a Flash read only memory (ROM) 28 which is a nonvolatile memory, and a buffer RAM 29 for temporary memory, as shown in FIG. 1.

The motor driver 21 drives the SPM 12 to rotate the magnetic disk 11 about a rotary axis at a predetermined rotation speed, under an instruction from the CPU 26. In addition, the motor driver 21 drives the VCM 16 to move the magnetic head 22 at a distal end of the actuator arm 15 in a radial direction of the magnetic disk 11, under an instruction from the CPU 26.

The magnetic head 22 includes a write head (not shown) to write data in the magnetic disk 11 and a read head (not shown) to read data written in the magnetic disk 11.

FIG. 2 is an illustration showing a positional relationship between a data sector and a servo sector included in each of a plurality of tracks defined on the magnetic disk 11. A shingled recording operation is hereinafter described with reference to FIG. 2. These operations are attained when the CPU 26 reads and executes the program stored in the flash ROM 28 or the magnetic disk 11. However, these operations can be also executed by structuring dedicated hardware.

In FIG. 2, Dn indicates a data sector where data corresponding to logical block address (LBA)n is stored, and sxy indicates a servo sector region where position information of servo cylinder number x and frame number y is prestored by a servo writer, etc. In the figure, for ease, the magnetic disk is designed to have ten data sectors and servo sectors in one track and have a track skew of two sectors between adjacent tracks for waiting for the rotational time. In general, a leading data sector (data of newest address) in each track of the hard disk drive (HDD) is physically displaced by some sectors to await a positioning wait time (i.e., rotation time) between tracks. The displacement is called a track queue, which is set in two sectors in the example of FIG. 2. The track queue corresponds to, for example, data sectors D00 to D10 or D10 to D20 in FIG. 2.

FIG. 3 is a diagram showing an example of a positioning error table 32 where a positioning error detected by reading and reproducing the servo sectors by the magnetic head 22 is stored. The positioning error table 32 is information indicating a difference (positioning error) between a predetermined target locus and a real locus in each servo sector. The positioning error table 32 is constituted in, for example, the SRAM 27 under control of the CPU 26. Servo0, Servo1, . . . are the numbers of servo frames. In the portions of s00, s01, . . . , the positioning errors detected by reproducing each servo sector are stored. In the positioning error table 32, for example, when the storage of track X+1 is completed, the information of the line of track X (first line) is deleted, and the information of the line of track X+1 (second line) is shifted to the first line. In the second line, the positioning error of track X+2 is stored. Here, the table structure immediately after the head 22 passed a circumference of track X+1 of FIG. 2 is shown. The portions of "-" are indefinite, and data will be stored later in these portions.

A storing process of the positioning error table 32 at the time of writing data D00 to D09 in FIG. 2 will be described here. First, when D00 is written, a radial positioning error of a head portion in D00 is most reflected on a positioning error detected by reading s00 by the magnetic head 22. The CPU 26 therefore stores the positioning error of s00 as a first element in the positioning error table 32.

Furthermore, since a positioning error of a tail portion in D00 is most reflected on a positioning error detected by reproducing s01, the CPU 26 stores the positioning error of s01 as a second element in the positioning error table 32. In other words, If the positioning error detected in servo sector sxy at the time of writing data in data sector Dn is expressed as sxy@Dn, the storage elements of the positioning error table 32 obtained immediately after reproducing the positioning error of s01, after writing D00, are the following two elements {s00@D00, s01@D00}.

Next, a case of writing D01 without making a rotation delay immediately after reproducing s01 and obtaining the positioning error is considered. At this time, in consideration of s01@D00 is equal to s01@D01, the storage elements of the positioning error table 32 obtained immediately after reproducing the positioning error of s02, after writing D01, are three elements {s00@D00, s01@D00 (=s01@D01), s02@D01}.

Furthermore, the storage elements of the positioning error table 32 obtained immediately after sequentially writing a last sector of a rotation, D09 without making a rotation delay, making a rotation, and reproducing the positioning error of s00 again are eleven elements {s00@D00,      s01@D00      (=s01@D01),
s02@D01   (=s02@D02),   s03@D02   (=s03@D03),
s04@D03   (=s04@D04),   s05@D04   (=s05@D05),
s06@D05   (=s06@D06),   s07@D06   (=s07@D07),
s08@D07   (=s08@D08),   s09@D08   (=s09@D09),
s00@D09}.

For example, in track X shown in FIG. 2, servo sector s00 at the left end and s00 at the right end indicate the identical servo sector. For convenience of explanation, the servo sector is thus separated to two parts. In addition, the positioning errors of s00 are the positioning error s00@D09 detected by reproducing s00 after writing D09, and the positioning error s00@D00 at the head portion of D00. s00@D00 and s00@D09 are the positioning errors of the identical servo sector. Since they correspond to a write start sector and a write end sector of the track X, their values are generally unequal to each other.

In such a case, a positioning error closer to a next track (track X+1) is adopted, and is stored in the positioning error table 32 as the positioning error of the servo sector. In the present case, positioning error s00@D0z closer to the subsequent track, of s00@D00 and s00@D09, is adopted and is stored in the positioning error table 32 as the positioning error of the servo sector s00. The reason will be described later.

Next, use of the storage elements of the positioning error table 32 at sequentially writing sectors D10 to D19 of a next tract is considered. First, positioning errors s02@D02 and s03@D02 corresponding to D02, I.E., written data sector adjacent to D10, are used to execute the writing of D10. More specifically, to suppress narrowing, the CPU 26 preliminarily suppresses proximity (overwriting) of D10 to D02 by, for example, setting a target radial position of s12@D10 based on s02@D02, and further setting a target radial position of s13@D10 based on s03@D02. In other words, the CPU 26 searches for positioning error information of the written track (track X) stored in the positioning error table 32, calculates correction amounts of writing target radial positions of a data sector to be written (D10) of a track (track X+1) to be newly written which is parallel to the written track and which is remote by a predetermined distance (target track pitch), and sets the target radial positions. The CPU 26 sets target radial positions of D11 to D19 in the similar manner.

As described above, positioning error s00@D0z closer to the next track (track X+1), of s00@D09 and s00@D00, is adopted and is stored in the positioning error table 32 as the positioning error of s00. Data written in D00 and D09 can be thereby certainly prevented from being damaged or overwritten by data written in D18 and D17, respectively, as understood from the method of suppressing the narrowing. In addition, as described later, two positioning errors mutually different from each other, which are related to the same servo sector, can be detected at executing the recording (in the middle of band) by switching a plurality of bands (i.e., a region of a track groups constituted by some hundreds of tracks; also called shingled track group) or at detection of an impulse, etc. In such a case, too, a positioning error closer to a next track is adopted and is stored in the positioning error table 32 for the same reason.

Next, a manner of positioning error determination based on read position dependency of read signal quality according to the present embodiment will be explained. The data region between two servo sectors is described as a data sector in the above explanations. However, the data sector does not indicate a region between two servo sectors alone. Thus, the region between the servo sectors will be described as "servo sector field" in the following explanations.

In the present embodiment, position dependency of read signal quality (hereinafter referred to as "read signal position dependency") is first measured prior to actual recording and reproduction. The read signal quality is, for example, information including signal-to-noise ratio (SNR), bit error rate (BER), viterbi metrics margin (VMM), and read signal intensity. The read signal position dependency can be obtained by measuring, in a servo sector field adjacent to the servo sector where a positioning error is preliminarily measured and stored, the read signal quality at a plurality of read positions obtained by shifting from an average radial position (corresponding to a radial position which is the target position at reading of the track) of the track including the servo sector field to a radial direction (inner peripheral side and outer peripheral side) by a predetermined distance. The read signal position dependency is first constituted in, for example, the SRAM 27, subjected to processing which will be described later, and stored in, for example, a read position dependency storing portion 34 in the Flash ROM 28 as "read position dependency information".

Figure 4:
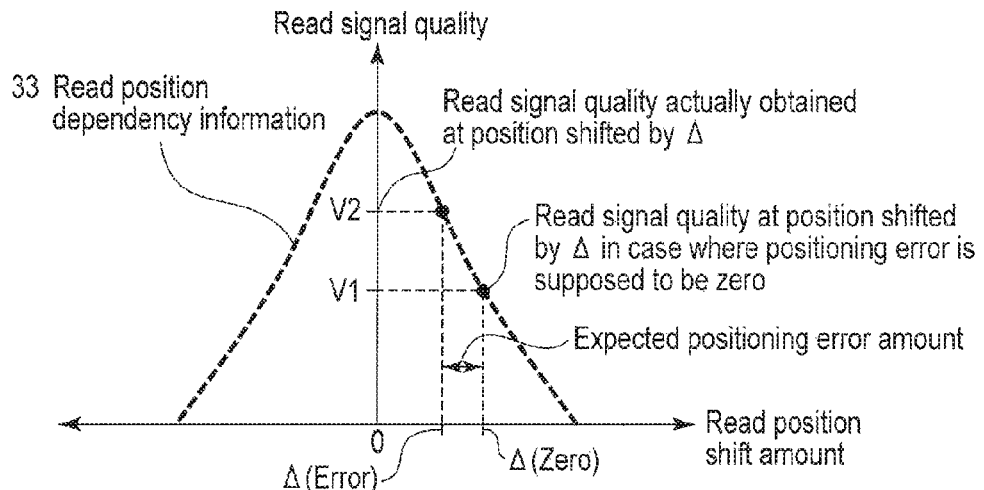
FIG. 4 is a graph schematically showing read position dependency information according to the embodiment.

FIG. 4 is a graph schematically showing the read position dependency information 33. In FIG. 4, a horizontal axis indicates a read position shift amount about the positioning error at the recording, and a vertical axis indicates a level (degree) of the read signal quality. In other words, a relationship between a radial read position in a servo sector field of a certain track and the read signal quality level is presented by setting the positioning error at a point of origin in FIG. 4.

It is assumed here that recording is executed in the middle of a certain band in a state in which positioning error information of a previous track adjacent to a recording target track (i.e., a track in which information is to be written) is not stored in the positioning error table 32. In this case, reading is executed at once or a plurality of times, for each servo sector field, at a radial position shifted from the average radial position of the previous track (corresponding to the radial position which is considered as a positioning target at reading of the previous track) by A in a recording target track direction or an opposite direction, and an average or a central value of the read signal qualities may be measurement value. The readings may be executed at one radial position alone.

Figure 5:
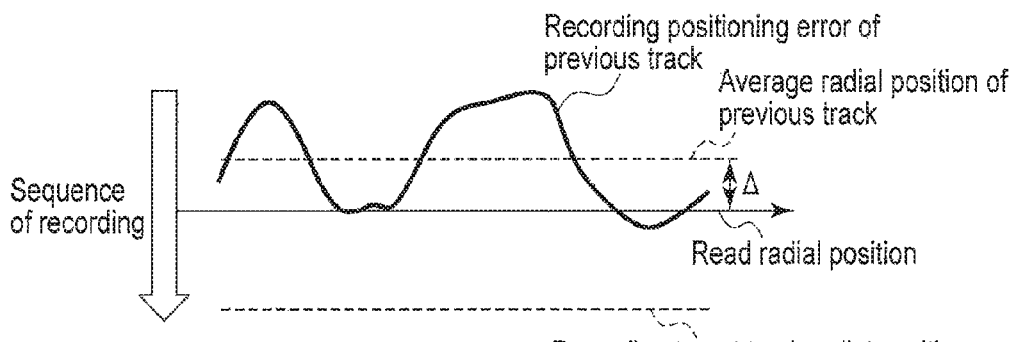
FIG. 5 is a graph schematically showing an operation of executing reading at a position shifted from an average radial position of a previous track to a target recording track side by A according to the embodiment.

FIG. 5 is a graph schematically showing an operation of executing the reading at a position (read radial position) shifted by Δ from the previous track average radial position to a recording target track side. Since the reading is executed at the position shifted from the average radial position of the previous track, the average value of the read signal quality is, naturally, inferior to the average value of the read signal quality at the average radial position at the previous track recording. However, in the servo sector field where a great positioning error occurs at the recording target track side from the average radial position of the previous track, at the recording of the previous track, the signal is read with better quality than the average value of the read signal quality at the average radial position of the previous track. In addition, in the servo sector field where a great positioning error occurs at an opposite side about the recording target recording track, a signal is read with quality inferior to the read signal quality at the average radial position of the previous track. By thus referring to the read signal quality measured at the position shifting by A and the premeasured and prestored read position dependency information 33, the positioning error information of the previous track of the recording target track can be obtained.

Figure 6:
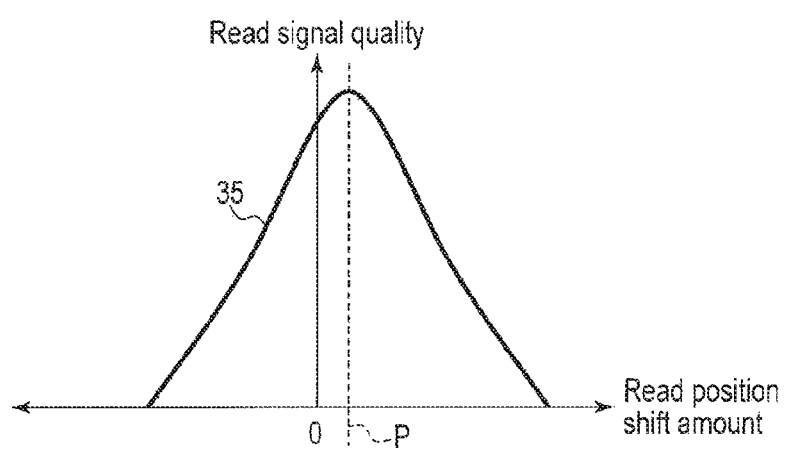
FIG. 6 is a graph schematically showing read signal position dependency according to the embodiment.

A concrete example will be explained with reference again to FIG. 4. A dotted curve indicates the read position dependency information 33 prestored in a read position dependency storing portion 34. The horizontal axis indicates the read position shift amount represented by setting the positioning error at the recording at a center. In a servo sector field having positioning error p from a prefixed track average radial position, a characteristic of the read signal quality in the servo sector field is presented by a curve having a peak at the positioning error p. FIG. 6 is a graph presenting such a characteristic of the read signal quality in the servo sector field (i.e., read signal position dependency 35).

A horizontal axis indicates the read position shift amount and a vertical axis indicates the read signal quality. An origin point of the vertical axis "0" presents the average radial position (target radial position at the recording) of the track including the servo sector field, and "p" presents the positioning error of the servo sector field. The read signal position dependency 35 is stored in the read position dependency storing portion 34 as the curve shown in FIG. 4 (read position dependency information 33) which is shifted by −p and has a peak at zero in the horizontal axis (origin point). In other words, the read position dependency information 33 shown in FIG. 4 is considered to indicate the position dependency of the read signal quality of the servo sector field in the track which is recorded with positioning error being zero.

It is considered here that the reading is executed at the position shifted by A from the average radial position of the previous track to the recording target track side as described above. The shift amount at this time is presented by Δ(zero) (cf. FIG. 4). If recording is executed with positioning error being zero, at the previous track recording, in a certain servo sector field of the previous track, read signal quality V1 is expected to be obtained from the read position dependency information 33. However, read signal quality V2 higher than V1 is assumed to be obtained as a real result of the measurement. In this case, it can be judged that a positioning error close to the target track side occurs in the servo sector field at the previous track recording. A shift amount obtained from the read signal quality V2 is presented by Δ(error), based on the read position dependency information 33. In this case, it can be assumed that the previous track has the positioning error corresponding to a distance "Δ(zero)−Δ(error)", at the target recording track side. The assumed positioning error amount "Δ(zero)−Δ(error)" is stored as the positioning error in the servo sector field. In other words, the distance between the shift position Δ(zero) and the shift position Δ(error) is stored as the positioning error. This positioning error may be stored as a positioning error of the servo sector immediately before the servo sector field or a positioning error of the servo sector immediately after the servo sector field.

Figure 7:
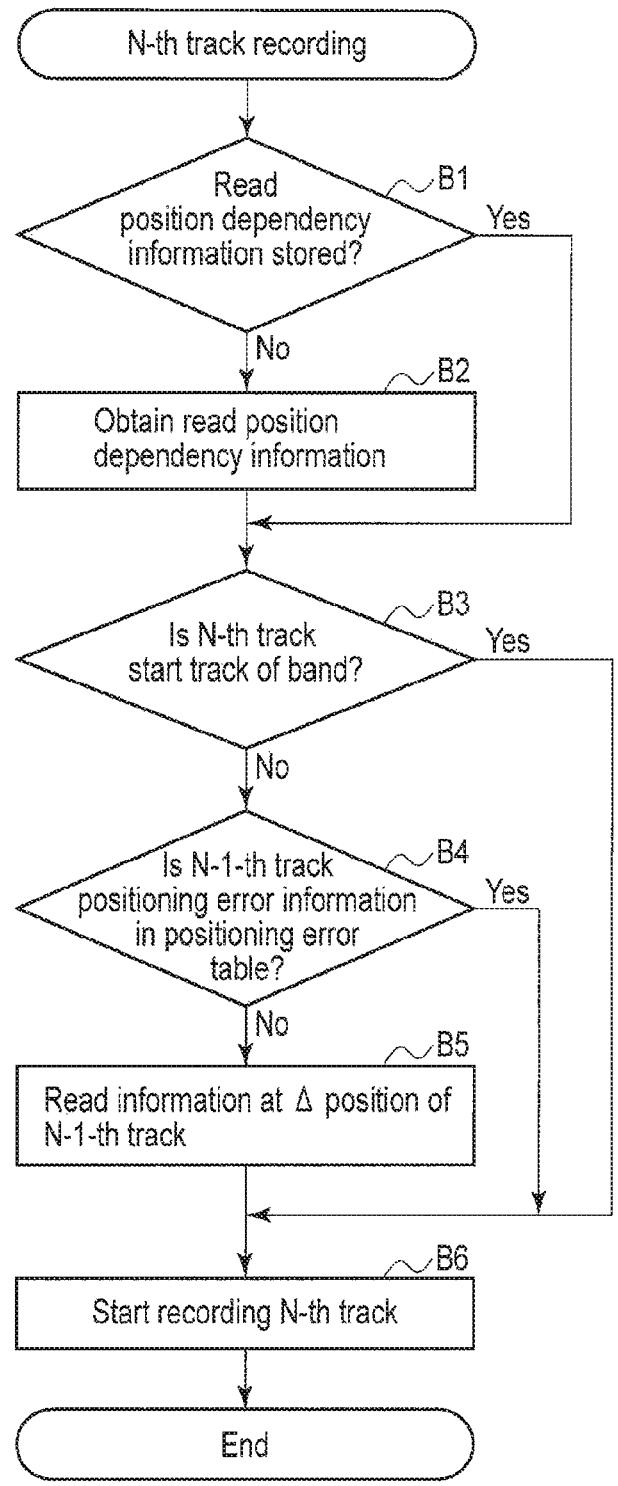
FIG. 7 is a flowchart showing an operation of first embodiment.

FIG. 7 is a flowchart showing an operation of the First Embodiment. Recording an N-th track on the magnetic disk 11 is exemplified according to the present embodiment.

First, the CPU 26 searches for the Flash ROM 28, and determines whether the read position dependency information 33 is stored in the read position dependency storing portion 34 (block B1). If the read position dependency information 33 is stored (Yes in block B1), the processing shifts to block B3.

If the read position dependency information 33 is not stored in the read position dependency storing portion 34 (No in block B1), the CPU 26 measures the read signal position dependency 35 in the servo sector field having the positioning error information stored in the positioning error table 32, obtains the read position dependency information 33, and stores the read position dependency information 33 in the read position dependency storing portion 34 as described above (block B2). In addition, the CPU 26 may obtain the read position dependency information 33 in each of a plurality of servo sector fields at the track where the positioning error has been measured and stored, and record the average value of a plurality of elements of the read position dependency information in the read position dependency storing portion 34 as the read position dependency information 33 for determination of the positioning error.

In block B3, the CPU 26 determines whether the N-th track is a leading track of the band to be written (i.e., band start track). If the N-th track is the band start track (Yes in block B3), the CPU 26 starts recording of the N-th track (block B6). If the N-th track is the band start track, the previous track is arranged at a position more separated than the track pitch in a band.

Therefore, the CPU 26 starts the recording of the N-th track without considering the narrowing of the previous track.

If the N-th track is not the band start track (No in block B3), the CPU 26 determines whether the positioning error information of the N−1-th track is stored in the positioning error table 32 (block B4). If the positioning error information of the N−1-th track is stored in the positioning error table 32 (Yes in block B4), the CPU 26 starts recording the N-th track, in the manner of suppressing the narrowing, by using the positioning error information of the N−1-th track (block B6).

If the positioning error information of the N−1-th track is not stored in the positioning error table 32 (No in block B4), the CPU 26 reads the information recorded in the servo sector fields of the N−1-th track, at the position shifted by A from the average radial position of the N−1-th track to the N-th track (track where information is to be recorded) side, and measures the read signal qualities as described above (block B5). The CPU 26 determines the positioning error in each servo sector field at the N−1-th track based on the read position dependency information 33 stored in the read position dependency storing portion 34 and the measured read signal qualities as described above, and stores the positioning errors of the N−1-th track in the positioning error table 32.

Incidentally, for example, the read position dependency information 33 may be obtained and stored for a plurality of tracks having the test pattern data recorded and having the positioning errors premeasured and prestored, and the read position dependency information 33 of the track closest to the N−1-th track, of the plurality of tracks, may be adopted to determine the positioning errors. The tracks having the read position dependency information 33 obtained and stored are assumed to be the following tracks: (1) a track arranged at each of an outer peripheral, middle peripheral and inner peripheral positions; (2) a track arranged at each of start, center and end positions of zones; (3) a track arranged at each of start, center and end positions of bands, etc. In addition, the read position dependency information of the plurality of tracks may be obtained at each of the positions in (1) to (3), and the average value of the plurality of elements of the read position dependency information at the respective positions may be stored in the read position dependency storing portion 34 as the read position dependency information 33 at each of the positions. The read position dependency information 33 at a position at which the N−1-th track belongs or a position closest to the N−1-th track, of the positions, is adopted for determination of the positioning error.

In block B6, the CPU 26 starts recording the N-th track, in the manner of suppressing the narrowing, as described above, by using the stored positioning error information of the N−1-th track. When the recording the N-th track is ended, the processing is ended.

According to the First Embodiment, as described above, greater band processing than that in prior art can be executed if the capacity of the positioning error table is the same as that in prior art. For example, the capacity of the positioning error table is set to be the capacity corresponding to six bands, the capacity for first five bands is used as the positioning error table similarly to prior art, and the remaining capacity for one band is used as the capacity for carrying out the present embodiment. Since the positioning error storage region used to accomplish the present embodiment can be updated (overwritten) as the bands increase, the number of recordable bands is not limited.

Second Embodiment

Next, Second Embodiment will be described.

In the Second Embodiment, when recording is interrupted during recording the information in band A and recording information in different band B is started, recording positioning error information of the track where the information is last recorded in band A is preliminarily recorded in the other region of a medium (magnetic disk 11).

Figure 8:
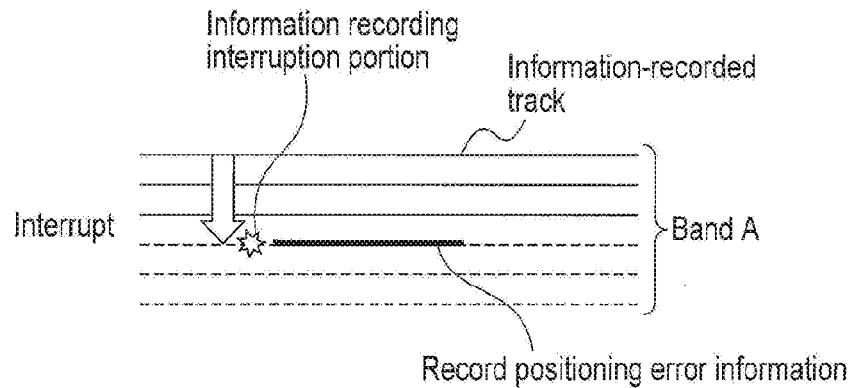
FIG. 8 is an illustration showing a region where a positioning error is recorded in second embodiment.

FIG. 8 is an illustration showing a region where a positioning error is recorded. It is desirable that the positioning error information of the track where the information is last recorded in band A should be recorded immediately after a recording interruption portion (servo sector field) of the track where the information is last recorded or in several servo sector fields after the interruption portion, to shorten a seek time, as presented by, for example, a thick line of FIG. 8.

After information recording of band B has been executed and then information recording is restarted in band A, the positioning error information of the track where the data recording is last executed, which is recorded after the recording interruption portion of the track where the information is last recorded, is reproduced. To optimize, for example a width of a track subsequent to the track where the information recording is interrupted, by using the reproduced positioning error information, a correction amount of a target radial position of the subsequent track is calculated and the information recording is started from a leading servo sector field of the subsequent track.

If the information recording is restarted from a servo sector field subsequent to the servo sector field where the information is last recorded, in the track where the information recording is interrupted, positioning error information for a distance of one track where the information recording is last executed is preliminarily recorded in a medium as shown in, for example, FIG. 8. The positioning error information for a distance of one track where the information recording is last executed indicates positioning errors from the servo sector field where the information recording is last executed to a servo sector field of a previous track adjacent to a servo sector field subsequent to the servo sector field where the information recording is last executed.

Next, if the information recording is restarted in the band A, the positioning error information for a distance of one track where the information recording is last executed in the band A, which is recorded after the interruption portion, is reproduced. The information recording is restarted in a manner of calculating, for example, a correction amount of a target radial position of the servo sector field for recording by using the reproduced positioning errors for a distance of one track, and overwriting information on the recorded positioning error information from a servo sector field subsequent to the portion where the information recording is interrupted.

Furthermore, if the information recording of a track subsequent to the track where the information recording is last executed is restarted at restarting the information recording of subsequent band A, the positioning error information of the track where the information recording is last executed may be recorded in a track subsequent to the track where the information recording is last executed.

Next, if the information recording is restarted in the band A, a region of the subsequent track recording the positioning error information of the track where the information recording is last executed in the band A, is reproduced. The information recording is restarted in a manner of calculating, for example, a correction amount of a target radial position in the subsequent track where the information recording of the band A is restarted, by using the reproduced positioning error, and overwriting information on the recorded positioning error information.

Figure 9:
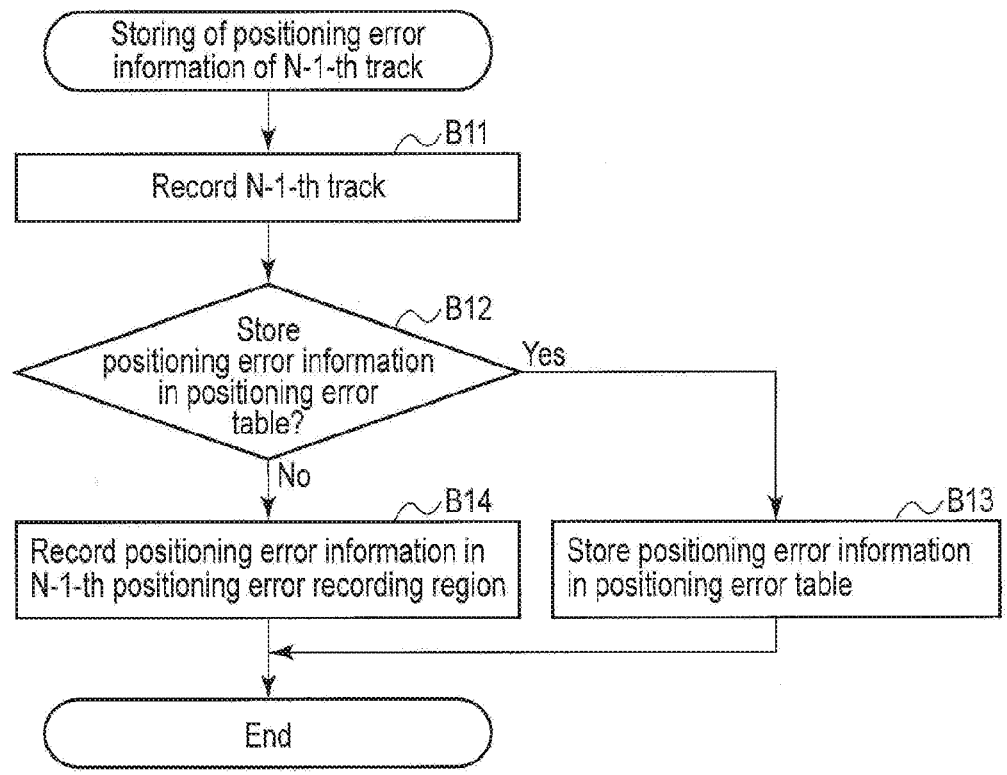
FIG. 9 is a flowchart showing an operation of the second embodiment.

FIG. 9 is a flowchart showing the operation of the Second Embodiment. An operation of recording in the magnetic disk 11 the positioning error information of the N−1-th track for recording the N-th track, according to the present embodiment, will be described.

The CPU 26 records the N−1-th track (block B11), and determines whether the positioning error information of the N−1-th track is stored in the positioning error table 32 (block B12). If the positioning error information of the N−1-th track is stored in the positioning error table 32 (Yes in block B12), the CPU 26 stores the positioning error information of the N−1-th track in the positioning error table 32 (block B13). If the positioning error information of the N−1-th track is not stored in the positioning error table 32 (No in block B12), the CPU 26 records the positioning error information of the N−1-th track in a predetermined region on the magnetic disk as described above (block B14). When the positioning error information of the N−1-th track is stored in the positioning error table 32 or in a predetermined region on the magnetic disk, the processing is ended.

Figure 10:
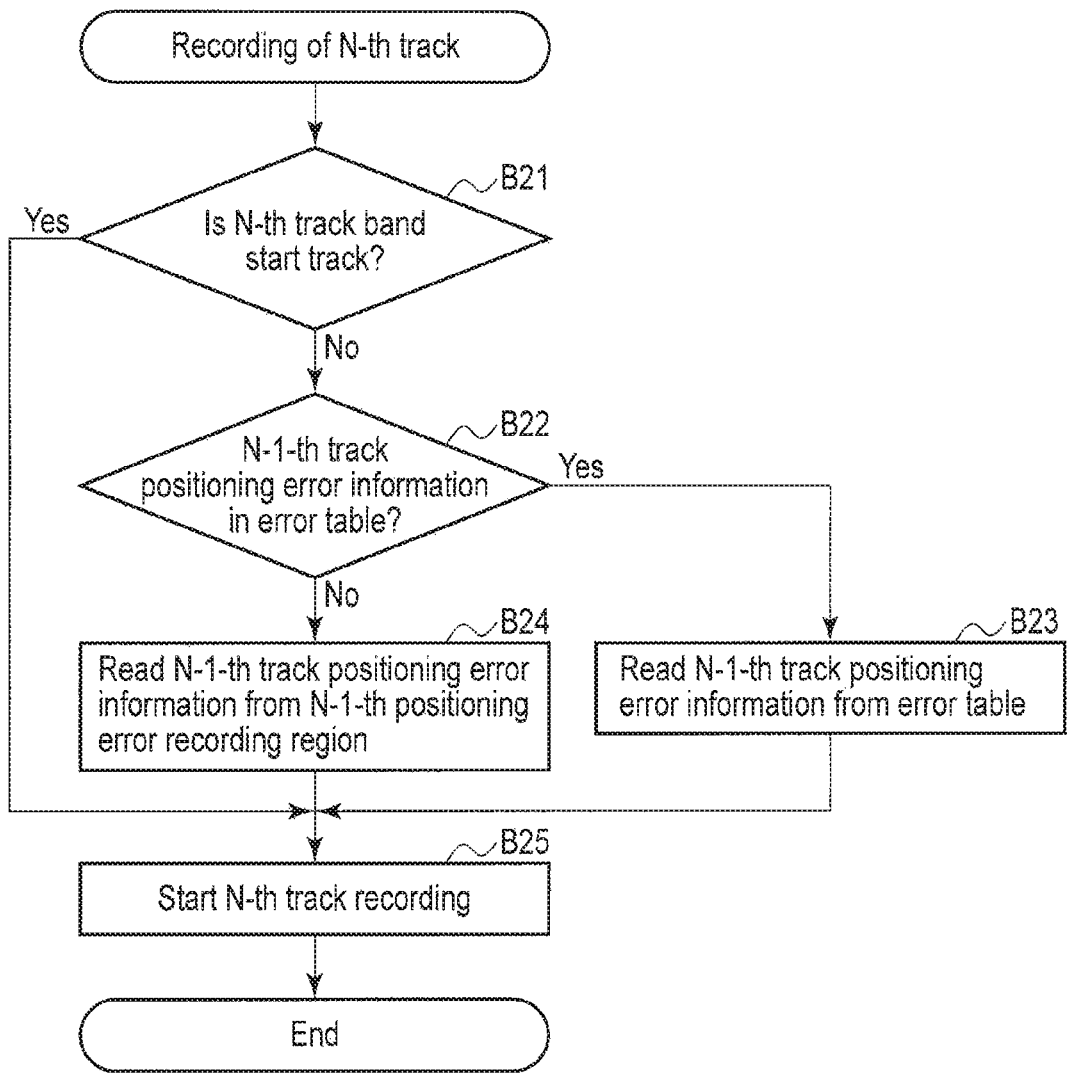
FIG. 10 is a flowchart showing another operation of the second embodiment.

FIG. 10 is a flowchart showing another operation of the Second Embodiment. An operation of recording the N-th track on the magnetic disk 11, according to the present embodiment, will be described.

First, the CPU 26 determines whether the N-th track is a band start track in the band to be written (block B21). If the N-th track is the band start track (Yes in block B21), the CPU 26 starts recording of the N-th track (block B25). This is because in the band start track, information can be recorded in the N-th track without considering narrowing with the previous track, as described above.

If the N-th track is not the band start track (No in block B21), the CPU 26 determines whether the positioning error information of the N−1-th track is stored in the positioning error table 32 (block B22). If the positioning error information is stored in the positioning error table 32 (Yes in block B22), the CPU 26 reads the positioning error of the N−1-th track from the positioning error table 32 (block B23).

If the positioning error information is not stored in the positioning error table 32 (No in block B22), the CPU 26 reads the positioning error information of the N−1-th track from the positioning error information recording region of the N−1-th track and stores the positioning error information in the positioning error table 32 (block B24).

In block B25, the CPU 26 starts recording of the N-th track, in the above-described manner of suppressing the narrowing, using the positioning error information of the N−1-th track obtained by the processing in block B23 or block 24. When the recording of the N-th track is ended, the present processing is ended.

According to the Second Embodiment, as described above, even when recording of a plurality of bands is executed while interrupting the recording, the recording can be executed by, for example, maintaining the in-track distance appropriately without loading great load on an external memory. In other words, since the positioning error storage region used to accomplish the Second Embodiment can be updated as the bands increase, the number of recordable bands is not limited, similarly to the First Embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk apparatus, comprising:
    a magnetic disk in which a plurality of tracks are defined, each of the tracks alternately comprising a plurality of data regions and servo regions including burst information for detecting a positioning error;
    a magnetic head writing and reading data for the magnetic disk; and
    a processor,
    wherein the processor is configured:
        to read, at data recording in a data region of a predetermined track, servo regions of the predetermined track by the magnetic head, and to detect a positioning error indicating displacement from a target write position of the predetermined track, for each of the servo regions;
        if data recording to a first track group on the magnetic disk is interrupted and data recording to a second track group is executed, to record a positioning error of a track where the data recording is last executed in the first track group, in a region on the magnetic disk; and if the data recording to the first track group is restarted, to reproduce the positioning error recorded in the region on the magnetic disk, and to record data subsequent to a portion where the data recording is interrupted, by using the magnetic head, in a shingled recording, to prevent the data recorded in the first track group from being overwritten by using the reproduced positioning error.

2. The apparatus of claim 1, wherein the processor records the positioning error of the track where the data recording is last executed, in a region after a recording interruption portion of the track where the data recording is last executed, and if the data recording to the first track group is restarted, reproduces the recorded positioning error of the recorded track, and restarts data recording from a track subsequent to the track where the data recording is last executed by using the reproduced positioning error.

3. The apparatus of claim 1, wherein the processor records the positioning error for a distance of a track where the data recording is last executed, in a region after a recording interruption portion of the track where the data recording is last executed, and if the data recording to the first track group is restarted, reproduces the recorded positioning error for a distance of a track, and restarts data recording from the region after the recording interruption portion of the track where the data recording is last executed by using the reproduced positioning error.

4. The apparatus of claim 1, wherein the processor records the positioning error of the track where the data recording is last executed, in a track subsequent to the track where the data recording is last executed, and if the data recording to the first track group is restarted, reproduces the recorded positioning error of the track, and restarts data recording from the track subsequent to the track where the data recording is last executed by using the reproduced positioning error.

5. A data recording method in an magnetic disk apparatus comprising: a magnetic disk in which a plurality of tracks are defined, each of the tracks alternately comprising a plurality of data regions and servo regions including burst information for detecting a positioning error; and a magnetic head writing and reading data for the magnetic disk; the method comprising:

reading, at data recording in a data region of a predetermined track, servo regions of the predetermined track by the magnetic head, and detecting a positioning error indicating displacement from a target write position of the predetermined track, for each of the servo regions;

if data recording to a first track group on the magnetic disk is interrupted and data recording to a second track group is executed, recording a positioning error of a track where the data recording is last executed in the first track group, in a region on the magnetic disk; and if the data recording to the first track group is restarted, reproducing the positioning error recorded in the region on the magnetic disk, and recording data subsequent to a portion where the data recording is interrupted, by using the magnetic head, in a shingled recording, to prevent the data recorded in the first track group from being overwritten by using the reproduced positioning error.

6. The method of claim 5, further comprising:

recording the positioning error of the track where the data recording is last executed, in a region after a recording interruption portion of the track where the data recording is last executed; and if the data recording to the first track group is restarted, reproducing the recorded positioning error of the recorded track, and restarting data recording from a track subsequent to the track where the data recording is last executed by using the reproduced positioning error.

7. The method of claim 5, further comprising:

recording the positioning error for a distance of a track where the data recording is last executed, in a region immediately after a recording interruption portion of the track where the data recording is last executed, and if the data recording to the first track group is restarted, reproducing the recorded positioning error for a distance of a track, and restarting data recording from the region immediately after the recording interruption portion of the track where the data recording is last executed by using the reproduced positioning error.

8. The method of claim 5, further comprising:

recording the positioning error of the track where the data recording is last executed, in a track subsequent to the track where the data recording is last executed, and if the data recording to the first track group is restarted, reproducing the recorded positioning error of the track, and restarting data recording from the track subsequent to the track where the data recording is last executed by using the reproduced positioning error.

* * * * *